2,880,231

DIETHYLSTILBESTROL BIS-β-BROMO-PROPIONATE

Louis Freedman, Mount Vernon, and Seymour L. Shapiro, Hastings on Hudson, N.Y., assignors to U.S. Vitamin Corporation, New York, N.Y., a corporation of Delaware No Drawing. Application August 10, 1956
Serial No. 603,216

1 Claim. (Cl. 260—479)

This invention relates to a new compound which is useful as an estrogenic agent and hypocholesterolemic agent. More specifically, the new compound is indicated for treatment of amenorrhea, atrophic vulvovaginitis, inhibition of lactation, in the treatment of the menopause, and in the prophylaxis and therapy of atherosclerosis.

The new compound of this invention can be prepared using conventional technics by reaction of the parent structure diethylstilbesterol with β-bromopropionyl chloride and may be represented generally by the structural formula

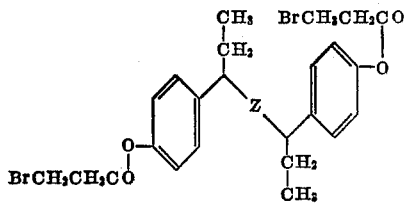

wherein Z is the linking element —C=C— (the diethylstilbesterol structure).

The compound of this invention is a well defined crystalline solid, quite soluble in oil and practically insoluble in water.

As illustrative of a method by which the new compound may be made, the following example is given:

EXAMPLE

*Bis-(β-bromopropionate) of diethylstilbesterol*

To a cooled (—10° C.) solution of 23 cc. of β-bromopropionyl chloride in 150 cc. of toluene, there is added dropwise with continued cooling and stirring, over a 1-hour period, a solution of 5 g. of diethylstilbesterol in 20 cc. of pyridine and 150 cc. of toluene. The reaction mixture is allowed to stand for 20 hours. The reaction mixture is diluted with water, shaken, the water separated and the toluene layer successively extracted with 30 cc. of 3 N hydrochloric acid, 30 cc. of water, 30 cc. of sodium bicarbonate solution, and 30 cc. of water. The toluene layer is then dried over anhydrous magnesium sulfate, filtered, the toluene distilled off in vacuo and the residue recrystallized from ethanol.

This new compound has a melting point of 134–5° C., and its formula is $C_{24}H_{26}O_4Br_2$.

What is claimed is:
Bis-β-bromopropionate of diethylstilbestrol.

References Cited in the file of this patent

UNITED STATES PATENTS

| | | |
|---|---|---|
| 2,346,049 | Rohrmann | Apr. 4, 1944 |
| 2,353,684 | Miescher et al. | July 18, 1944 |